W. S. LEE.
APPARATUS FOR THE ENDOTHERMIC REACTION OF GASES.
APPLICATION FILED MAR. 4, 1911. RENEWED JUNE 22, 1912.
1,051,131.
Patented Jan. 21, 1913.
3 SHEETS—SHEET 1.
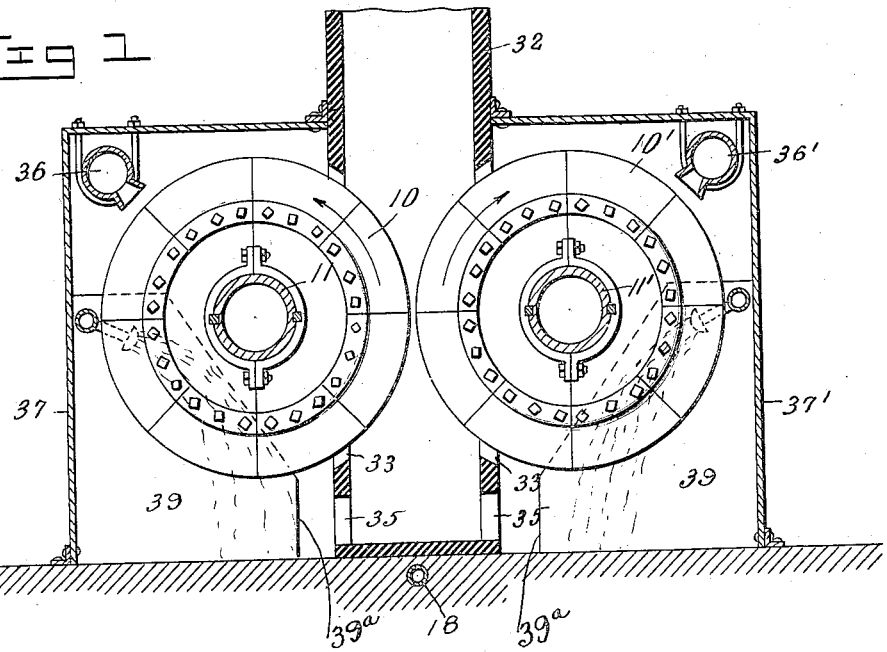
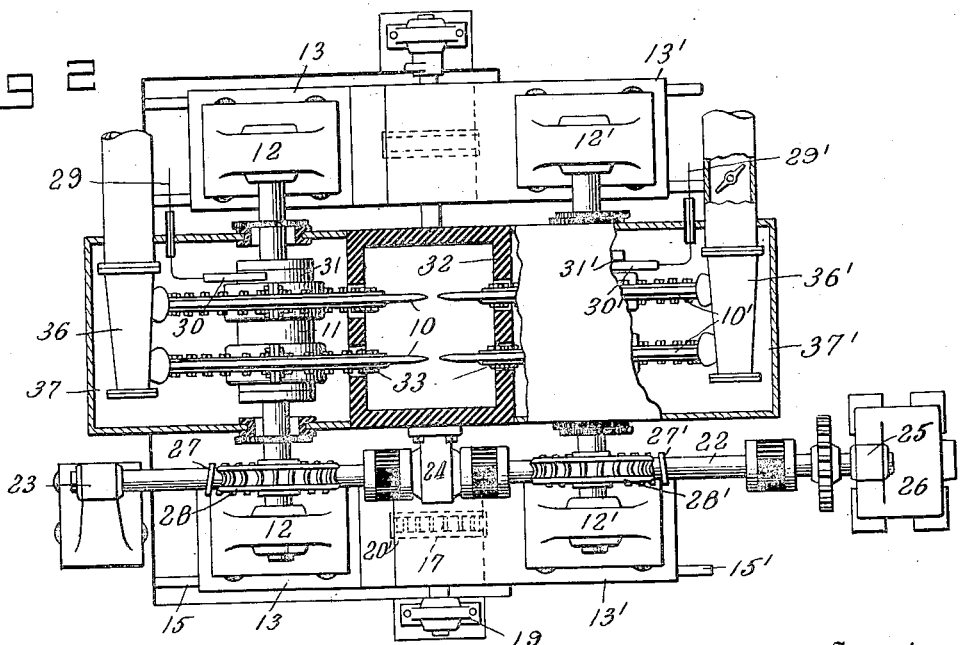
Inventor
William S. Lee
Witnesses
By Meyers, Cushman & Rea.
Attorney W. S. LEE.
APPARATUS FOR THE ENDOTHERMIC REACTION OF GASES.
APPLICATION FILED MAR. 4, 1911. RENEWED JUNE 22, 1912.
1,051,131.
Patented Jan. 21, 1913.
3 SHEETS—SHEET 2.
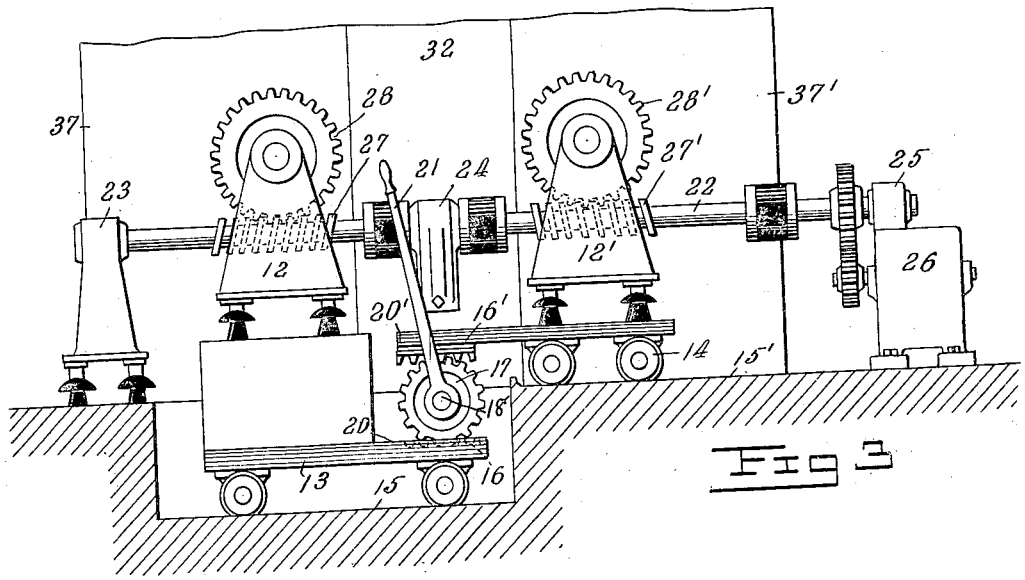
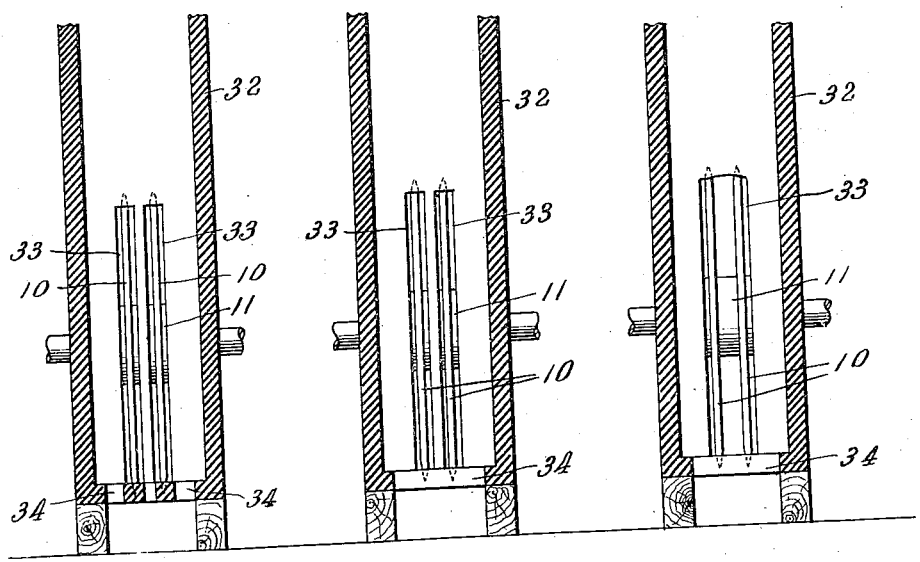
Inventor
William S. Lee
By Meyers, Cushman & Rea
Attorney
Witnesses

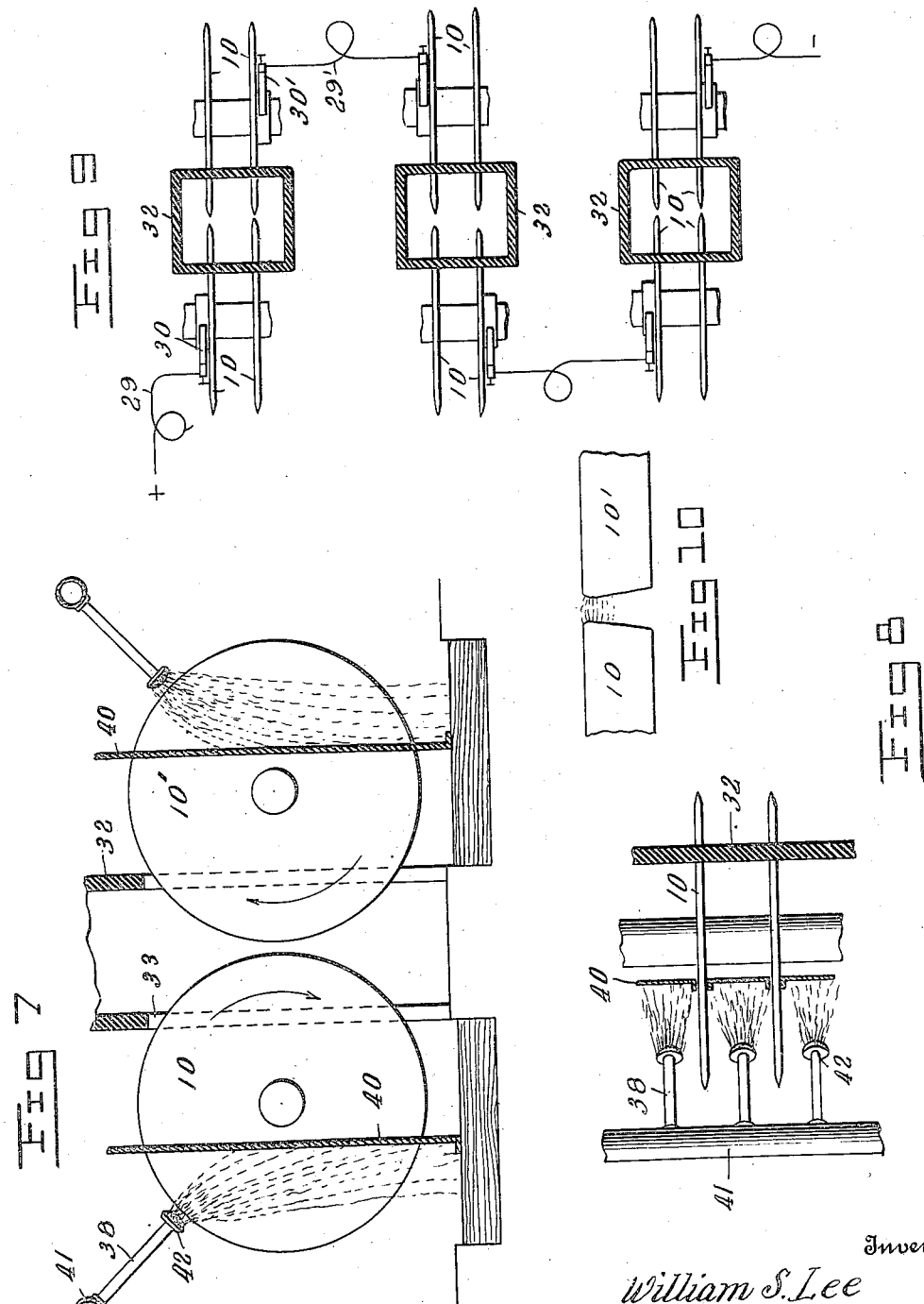

UNITED STATES PATENT OFFICE.

WILLIAM S. LEE, OF CHARLOTTE, NORTH CAROLINA.

APPARATUS FOR THE ENDOTHERMIC REACTION OF GASES.

1,051,131.   Specification of Letters Patent.   Patented Jan. 21, 1913.

Application filed March 4, 1911, Serial No. 612,324. Renewed June 22, 1912. Serial No. 705,309.

*To all whom it may concern:*

Be it known that I, WILLIAM S. LEE, a citizen of the United States, residing at Charlotte, in the county of Mecklenburg and State of North Carolina, have invented new and useful Improvements in Apparatus for the Endothermic Reaction of Gases, of which the following is a specification.

The invention relates to apparatus for producing endothermic reactions in gases, and is designed chiefly for the fixation of nitrogen. The said apparatus comprises two continuously moving surfaces, and mountings for the same, means for moving them continuously away from each other, electrical connections to said surfaces through which electric power may be conducted to maintain an arc between the surfaces, and means for directing the gas to be acted upon in the vicinity of and through the arc. In the embodiment which I disclose herein I make use of rotatably mounted circular disks of the material adapted to be rotated in opposite directions (although they may be rotated in the same direction), the disks being located in a common plane, and the arc being struck between them initially on the line of centers of the disks.

Additionally my invention comprises structural features for the effectual leading of the gases to and from the arc, for the cooling of the moving surfaces, for the proper insulation of these surfaces, for the adjustment of these surfaces to compensate for wear, and other perhaps minor detail features.

In the accompanying drawings I show several embodiments of my invention.

Figure 1 is a central vertical transverse section of one form of the apparatus. Fig. 2 is a plan view of the same apparatus. Fig. 3 is an end elevation of the same. Figs. 4, 5 and 6 are details showing modified means for directing the gases into the arcs. Fig. 7 is a vertical transverse section of a modified apparatus. Fig. 8 is a sectional plan view of a portion of the same, showing particularly the means for cooling the moving surfaces. Fig. 9 is a diagrammatic view showing the electrical connections of a series of apparatuses. Fig. 10 is a view showing modified forms of disks.

Referring first to Figs. 1 and 2, 10, 10' designate right and left circular disks which constitute the continuously moving surfaces, between which the electric arc is struck. These disks, as shown are relatively thin, but they may be made as thick on the edge portions as is found desirable to suit the power conditions, and to compensate for wearing away. (See Fig. 10.) The arc may travel back and forth then parallel to their axes, from point to point. The result is long life. They are made in two halves bolted together and about the supporting shafts 11 and 11', and as shown, located adjacent each other and in the same transverse plane. They may have removable peripheral wearing sections as shown. There are one or more of these disks on each shaft.

The invention may be carried out by the provision of a single disk on each shaft, and this arrangement may be duplicated by providing two, or any desired number, of disks on each shaft. For the purpose of illustration merely the drawings show apparatus organized with two disks on each shaft.

The shafts are journaled in end bearings 12, 12' mounted on and insulated from bearing carriages 13, 13' adapted by means of wheels 14 to move laterally, carrying the bearings, on track ways 15, 15'. One of these track ways 15 is below the other 15', so that the projecting ends 16, 16' of the carriages overlap each other. Between them is provided a pinion 17 secured on a fixed shaft 18 journaled in bearings 19. Racks 20 and 20' on the projecting ends 16, 16' of the carriages are engaged by this pinion. By rotating the shaft 18 it will be seen that the carriages 13, 13' may be moved toward and from each other. A lever 21 connecting with the shaft 18 is provided for this purpose. Thus the parallel shafts may be moved toward and from each other in parallel relation.

Extending transversely of the shafts 11 and below them at one end is a drive shaft 22 supported in insulated bearings 23, 24 and 25. This shaft is adapted to be continuously driven by an electric motor 26. Right and left hand worms 27, 27' on the drive shaft are provided, engaging gears 28, 28' on the shafts 11, whereby the disks 10, 10' are continuously rotated from the drive shaft 22.

Electrical connections to the disks are made through conductors 29, 29' connecting with brushes 30, 30' bearing upon suitable rings 31, 31' on the shafts 11 and electrically connected with the disks 10, 10'. Upon the application of a suitable electric potential to the conductors 29, 29', electric arcs may be struck between the surfaces 10, 10' at their most closely adjacent points on their line of centers. Immediately, due to the flaring of the surfaces away from each other, the arc runs up upon them, due to the same reasons on account of which it runs up upon a horn shaped electrode as is well understood in the art. Due to the draft created by the arc in most cases the arc will run up instead of down, thus confining itself to the space above the line of centers of the disk. Upon the rotation of the disks, in the direction of the arrows, however, even if the arc has taken a place below the line of centers, it is quickly transferred above the line of centers, and the arc upon the continued rotation is spread to form an arc flame of very great surface area. If the disks are rotated oppositely, the arc may be maintained below the line of centers.

By the provision of a chimney 32, into the center of which the disks 10, 10' project through slits 33 in opposite sides, the gas to be acted upon is most readily directed to the arc. When the gas to be acted upon is atmospheric air, this air is drawn into the chimney by natural draft passing through openings 33 between the adjacent edges of the chimney walls and the sides of the disks. It passes inward and upward in the direction of movement of the surfaces of the disks 10, 10' directly over and through the arc of great area produced as described. Instead of using the form of chimney shown in Fig. 1, I may use the form shown in Fig. 4, in which, in addition to the slits 33, the openings 34 are provided in the bottom of the chimney, or the form of Fig. 5, in which the entire bottom of the chimney is open, or the form of Fig. 6 which differs from the form of Fig. 5 in that two adjacent openings 33 are merged and a single opening of much larger area provided and through which the pairs of disks 10 project into the chimney. In the form of Fig. 1 additional lateral openings 35 may be provided as shown.

In combination with the apparatus as thus described, I provide a most efficient means for cooling the disks 10, 10', both by means of the gas to be acted upon, thus affecting a preliminary heating of that gas, which has proven most efficacious in several forms of the apparatus, and also a means for cooling, additionally by means of another fluid. In Figs. 1 and 2 are shown means for introducing air, in the form of conduits 36, 36', which direct it upon the surfaces of the disks 10, 10' between the chimney 32. In order to further the efficiency of this action the portions of the disks 10, 10' without the chimney are housed in chambers 37, 37', and the fluid operated upon introduced entirely through the conduits 36, 36'. The entire mass of gas operated upon is therefore heated in the cooling of the hot disks 10, 10'. Additionally the disks are cooled by jets of water 38 directed on the surfaces of the disks in chambers 39 sub-divided from the main chambers 37 by means of suitable partitions 39ª. By virtue of the sub-division of the chambers 37, the entrance of the mixture of the water with the gases is effectually prevented.

In Figs. 7 and 8 is shown a modified form of apparatus, in which the cooling is accomplished mainly by water, the sub-division of the chambers 37 being made by a vertical partition 40, instead of the partition of the form shown in Fig. 1. In this form also water is introduced through a manifold 41, feeding spray heads 42, which discharge one between each two adjacent surfaces of the pairs of disks. This is the apparatus of my invention. It should be evident that I may use together as many of the apparatuses shown as I may desire, connected either in series or in parallel relation. In Fig. 9 I show the usual method of connecting these apparatuses in series, and in this example of my invention show two arcs in parallel in each apparatus. As is common in the art I may connect to a single source of power as many of these apparatus in series as I may desire. With this knowledge of the apparatus of my invention, the operation thereof is apparent but may be briefly stated. The arc is struck between the surfaces which move continuously away from each other. The portions of the disks 10 above the center line move continuously away from each other. The arc is thus flared and given a very extended area, due combinedly to the flaring of the surfaces away from each other and to their actual continuous movement away from each other. As far as movement away from each other is concerned, it will be evident that the disks may be rotated in the same direction as shown diagrammatically in Fig. 7. In this instance there is produced a very intense arc of extended proportions between the portions of the disks most closely related to each other and extending some distance along the line perpendicularly to the line of centers of the disks. Air is passed in the vicinity of and through this arc, and according to the method, passed in the direction of movement of the adjacent surfaces, thus being acted upon thoroughly. By suitably varying the speed of passage of the gas by and through the arc, reaction may be had as full and as complete as desired. It is needless to add perhaps that the reactions produced by this apparatus will be highly efficient. The requirements as to intense heat of the arc, and action of the arc upon the entire mixture, and the passage of the greatest quantity of gas past the arc, in a given time, and the rapid removal of the gas thoroughly acted upon from the arc, are each and all most readily fulfilled by the use of this apparatus. Additionally it may be mentioned that the moving surfaces may be adjusted much closer to each other than stationary surfaces. Hence, there is less tendency for the arc to break, and when broken it is easier to start.

I desire to cover in the annexed claims all such modifications of my invention as may be made by those skilled in the art without departing from what may be termed the legal purview of my invention.

Having thus described the invention what is claimed as new is:—

1. An apparatus for producing endothermic reactions in gases comprising two endless surfaces adjacent each other, means for moving said surfaces in opposite directions, electrical connections to said surfaces by which said surfaces may be connected to a source of electrical energy, and means for directing the gas to be acted upon between the adjacent moving portions of said surfaces.

2. An apparatus for producing endothermic reactions in gases, a pair of rotating disks adjacent each other and spaced apart, means for rotating said disks, connections from said disks adapting them for connection with a source of electrical energy, and means for directing the gas to be acted upon between the adjacent moving portions of said surfaces.

3. An apparatus for producing endothermic reactions in gases comprising a pair of rotatable disks located in the same plane and spaced apart, and electrical connections to said disks, and means for directing the gas to be acted upon between the adjacent moving portions of said surfaces.

4. An apparatus for producing endothermic reactions in gases comprising rotatable disks spaced apart, parallel shafts supported upon said disks, means for moving the shafts toward and from each other in parallel relation, to vary the position of the disks with respect to each other, electrical connection to said disks, and means for directing the gas to be acted upon between the adjacent moving portions of said disks.

5. An apparatus for producing endothermic reactions in gases comprising two endless surfaces, means for moving said surfaces with respect to each other, electrical connections to said surfaces, a chimney surrounding the adjacent portions of said surfaces, an air inlet to said chimney, and an air outlet to said chimney.

6. An apparatus for producing endothermic reactions in gases comprising two endless surfaces, means for moving said surfaces with respect to each other, electrical connections to said surfaces, a chimney surrounding the adjacent portions of said surfaces, and lateral openings through which the surfaces project, said openings being wider than the said surfaces are thick.

7. An apparatus for producing endothermic reactions in gases comprising two endless surfaces, means for moving said surfaces with respect to each other, electrical connections to said surfaces, a chimney surrounding the adjacent portions of said surfaces, lateral openings through which the surfaces project, said openings being wider than the said surfaces are thick, and additional openings at the bottom of said chimney.

8. An apparatus for producing endothermic reactions in gases comprising two endless surfaces, means for moving said surfaces with respect to each other, electrical connections to said surfaces, a chimney surrounding the adjacent portions of said surfaces, an air inlet to said chimney, an air outlet to said chimney, an inlet chamber adjoining said chimney, and means for directing gas through said chamber.

9. An apparatus for producing endothermic reactions in gases comprising two endless surfaces, means for moving said surfaces with respect to each other, electrical connections to said surfaces, a chimney surrounding the adjacent portions of said surfaces, an air inlet to said chimney, an air outlet to said chimney, an inlet chamber adjoining said chimney and in which the outer portions of the moving surfaces are housed, and means directing the gas to be acted upon into said inlet chamber and upon the surfaces.

10. An apparatus for producing endothermic reactions in gases comprising two endless surfaces adjacent each other, means for moving said surfaces in opposite directions, electrical connections to said surfaces by which said surfaces may be connected to a source of electrical energy, means for directing the gas to be acted upon between the adjacent moving portions of said surfaces, and cooling means for said surfaces.

11. An apparatus for producing endothermic reactions in gases comprising two endless surfaces adjacent each other, means for moving said surfaces in opposite directions, electrical connections to said surfaces, a chimney surrounding the adjacent portions of said surfaces, an air inlet to said chimney, an air outlet to said chimney, an inlet chamber adjoining said chimney and in which the outer portions of the moving surfaces are housed, means directing the gas to be acted upon into said inlet chamber and upon the surfaces, and additional cooling means for said surfaces.

12. An apparatus for producing endothermic reactions in gases comprising a pair of moving surfaces, means for continuously moving said surfaces away from each other, electrical connections to said surfaces, and means for adjusting the distance between the surfaces.

13. An apparatus for producing endothermic reactions in gases comprising two endless surfaces adjacent each other, means for moving said surfaces in opposite directions, electrical connections to said surfaces by which said surfaces may be connected to a source of electrical energy, and means for directing the gas to be acted upon between the adjacent moving portions of said surfaces, the wearing portions of said endless surfaces being constituted by removable sections.

In testimony whereof I have hereunto set my hand in presence of two subscribing witnesses.

WILLIAM S. LEE.

Witnesses:
A. H. BURROUGHS,
L. A. HAMMERSLEY.